(12) United States Patent
Li et al.

(10) Patent No.: US 11,218,277 B2
(45) Date of Patent: Jan. 4, 2022

(54) CSI INFORMATION REPORTING AND RECEIVING METHOD AND COMMUNICATION DEVICE

(71) Applicant: CHINA ACADEMY OF TELECOMMUNICATIONS TECHNOLOGY, Beijing (CN)

(72) Inventors: Hui Li, Beijing (CN); Qiubin Gao, Beijing (CN); Tamrakar Rakesh, Beijing (CN); Runhua Chen, Beijing (CN); Xin Su, Beijing (CN); Deshan Miao, Beijing (CN); Qiuping Huang, Beijing (CN); Mengjun Wang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 16/645,524

(22) PCT Filed: Jun. 28, 2018

(86) PCT No.: PCT/CN2018/093407
§ 371 (c)(1),
(2) Date: Mar. 9, 2020

(87) PCT Pub. No.: WO2019/047598
PCT Pub. Date: Mar. 14, 2019

(65) Prior Publication Data
US 2020/0280420 A1 Sep. 3, 2020

(30) Foreign Application Priority Data
Sep. 8, 2017 (CN) .................. 201710807356.X

(51) Int. Cl.
*H04L 5/00* (2006.01)

(52) U.S. Cl.
CPC .......... *H04L 5/0057* (2013.01); *H04L 5/0007* (2013.01); *H04L 5/0042* (2013.01); *H04L 5/0094* (2013.01)

(58) Field of Classification Search
CPC ... H04L 5/0057; H04L 5/0048; H04L 1/0026; H04W 72/0413; H04W 72/042
See application file for complete search history.

(56) References Cited

U.S. PATENT DOCUMENTS

2004/0218519 A1  11/2004  Chiou et al.
2016/0100398 A1*  4/2016  Xia .................. H04W 72/0413
370/330

(Continued)

FOREIGN PATENT DOCUMENTS

CN  101877884 A  11/2010
CN  102378114 A  3/2012

(Continued)

OTHER PUBLICATIONS

CATT,"Multiplexing of UCI and UL data on PUSCH", 3GPP TSG RAN WG1 Meeting #90, Prague, Czechia, Aug. 21-25, 2017, total 4 pages, R1-1712407.

(Continued)

*Primary Examiner* — Kevin Kim
(74) *Attorney, Agent, or Firm* — Kilpatrick Townsend & Stockton, LLP

(57) ABSTRACT

Provided in the embodiments of the present application are a channel state indication (CSI) information reporting and receiving method and a communication device, which are used to provide for a terminal in an NR system a solution for mapping CSI information to an uplink channel and transmitting the same. The method comprises: a terminal receives an uplink channel resource configuration signaling and/or a demodulation reference signal (DMRS) configuration signaling sent by a base station, and determines a mapping (Continued)

symbol set, wherein the DMRS configuration signaling is used to indicate the number of DMRSes configured by a system for an uplink channel and the time-frequency location of an occupied OFDM symbol, the uplink channel resource configuration signaling represents the time-frequency resource of the uplink channel, and the mapping symbol set is a set of symbols adjacent to the OFDM symbol; and the terminal measures a downlink channel, calculates CSI information, encodes the CSI information, and maps an information part comprising rank indication (RI) information onto an RE of at least one orthogonal frequency-division multiplexing (OFDM) symbol in the mapping symbol set to carry out transmission.

14 Claims, 9 Drawing Sheets

(56) References Cited

U.S. PATENT DOCUMENTS

| | | |
|---|---|---|
| 2017/0195031 A1 | 7/2017 | Onggosanusi et al. |
| 2017/0257860 A1 | 9/2017 | Nam et al. |
| 2019/0069312 A1* | 2/2019 | Oh .................. H04W 72/12 |
| 2020/0029325 A1 | 1/2020 | Hwang et al. |

FOREIGN PATENT DOCUMENTS

| | | |
|---|---|---|
| CN | 106411374 A | 2/2017 |
| CN | 106685598 A | 5/2017 |
| EP | 3399663 A1 | 11/2018 |
| KR | 1020050107106 A | 11/2005 |
| WO | 2017019132 A1 | 2/2017 |
| WO | 2017026814 A1 | 2/2017 |
| WO | 2017078826 A1 | 5/2017 |
| WO | 2017135737 A1 | 8/2017 |

OTHER PUBLICATIONS

NTT DOCOMO,"Feedback Design for CSI Type I", 3GPP TSG RAN WG1 Meeting #90, Prague, Czechia, Aug. 21-25, 2017, total 7 pages, R1-1713915.

InterDigital, Inc.,"Remaining Issues on DM-RS" 3GPP TSG RAN WG1 Meeting #90, Prague, Czech Republic, Aug. 21-25, 2017, total 4 pages, R1-1714144.

* cited by examiner

CSI INFORMATION REPORTING AND RECEIVING METHOD AND COMMUNICATION DEVICE

The present application is a US National Stage of International Application No. PCT/CN2018/093407, filed on Jun. 28, 2018, which claims the priority from Chinese Patent Application No. 201710807356.X, filed with the Chinese Patent Office on Sep. 8, 2017 and entitled "CSI Information Reporting and Receiving Method and Communication Device", which is hereby incorporated by reference in its entirety.

FIELD

The present application relates to the field of communication technologies and particularly to a CSI information reporting and receiving method and a communication device.

BACKGROUND

The MIMO (Multi-Input Multiple-Output) technology, as the important physical-layer multi-antenna technology to improve the transmission quality and efficiency, plays an important role in the new generation of communication systems. The New Radio Access Technology (New RAT, NR) systems or LTE (Long Term Evolution) systems support the transmit diversity, spatial multiplexing technology, and Beam Forming (BF) and other MIMO technologies.

In order to make better use of the advantages of the MIMO technology, the pilot structure in the system has also changed accordingly. Generally, the downlink pilots sent by the base station include the demodulation pilot (i.e., Demodulation Reference Signal (DMRS)) and the measurement pilot (i.e., Channel State Indication-Reference Signal (CSI-RS)).

At present, in the MIMO system, after measuring the downlink channel, a terminal may calculate the Channel State Information (CSI), and then pass the CSI information through the uplink channel, such as Physical Uplink Control Channel (PUCCH) or Physical Uplink Shared Channel (PUSCH) for reporting, but there is no corresponding solution on how the terminal maps the CSI information to the uplink channel and transmits the CSI information in the NR system.

SUMMARY

The embodiments of the present application provide a method of reporting the CSI information, a method of receiving the CSI information and communication devices, so as to solve the technical problem that there is no corresponding solution on how the terminal maps the CSI information to the uplink channel and transmits the CSI information in the NR system.

In a first aspect, an embodiment of the present application provides a method of reporting CSI information, which includes the steps of:

receiving, by a terminal, an uplink channel resource configuration signaling and/or a Demodulation Reference Signal, DMRS, configuration signaling sent by a base station, and determining a mapping symbol set according to the uplink channel resource configuration signaling and/or the DMRS configuration signaling; wherein the DMRS configuration signaling is used to indicate the quantity of DMRSs configured by a system for an uplink channel and a time-frequency position of an Orthogonal Frequency Division Multiplexing, OFDM, symbol occupied by each DMRS in time-frequency resources carrying the uplink channel, the uplink channel resource configuration signaling is used to indicate time-frequency resources occupied by the uplink channel, and the mapping symbol set is a set of OFDM symbols adjacent to the OFDM symbol in the time-frequency resources;

measuring, by the terminal, a downlink channel, and calculating Channel State Information, CSI, according to a measurement result;

coding, by the terminal, the CSI information, and mapping an information part containing Rank Indication, RI, information in the coded CSI information onto Resource Elements, REs, of at least one OFDM symbol in the mapping symbol set for transmission.

In a possible embodiment, after the terminal codes the CSI information and maps the information part containing the RI information in the coded CSI information onto the REs corresponding to at least one OFDM symbol in the mapping symbol set for transmission, the method further includes:

determining, by the terminal, remaining OFDM symbols unmapped in the mapping symbol set and remaining CSI information parts in the coded CSI information other than the information part containing the RI information;

mapping, by the terminal, the remaining CSI information parts onto REs of the remaining OFDM symbols for transmission, and/or onto REs of OFDM symbols other than the OFDM symbols contained in the mapping symbol set in the time-frequency resources for transmission.

In a possible embodiment, after the terminal codes the CSI information and maps the information part containing the RI information in the coded CSI information onto the REs of at least one OFDM symbol in the mapping symbol set for transmission, the method further includes:

determining, by the terminal, remaining CSI information parts in the coded CSI information other than the information part containing the RI information;

mapping, by the terminal, the remaining CSI information parts onto REs corresponding to OFDM symbols other than the OFDM symbols contained in the mapping symbol set in the time-frequency resources for transmission.

In a possible embodiment, before the terminal codes the CSI information, the method further includes:

acquiring, by the terminal, CSI feedback configuration information sent by the base station, wherein the CSI feedback configuration information is used to indicate a feedback mode configured by the system for the terminal to report the CSI information;

determining, by the terminal, an uplink channel used by the CSI information according to the CSI feedback configuration information and a correspondence between feedback modes and uplink channels;

coding, by the terminal, the CSI information, includes:

coding, by the terminal, the CSI information according to the determined feedback mode and a correspondence between feedback modes and coding modes; wherein the coding modes include an overall coding mode and a split coding mode.

In a second aspect, an embodiment of the present application provides a method of receiving CSI information, which includes:

sending, by a base station, an uplink channel resource configuration signaling and/or a Demodulation Reference Signal, DMRS, configuration signaling to a terminal; wherein the DMRS configuration signaling is used to indicate the quantity of DMRSs configured by a system for an uplink channel and a time-frequency position of an Orthogonal Frequency Division Multiplexing, OFDM, symbol occupied by each DMRS in time-frequency resources carrying the uplink channel, the uplink channel resource configuration signaling is used to indicate time-frequency resources occupied by the uplink channel;

receiving, by the base station, coded Channel State Information, CSI, fed back by the terminal, and obtaining Rank Indication, RI, information included in the coded CSI information; wherein an information part including the RI information in the coded CSI information is mapped onto Resource Elements, REs, of at least one OFDM symbol in a mapping symbol set that is a set of OFDM symbols adjacent to the OFDM symbol occupied by the DMRS in the time-frequency resources carrying the uplink channel;

decoding, by the base station, the coded CSI information according to the RI information.

In a possible embodiment, before the base station receives the coded CSI fed back by the terminal and obtains the RI information included in the coded CSI information, the method further includes:

configuring, by the base station, CSI feedback configuration information used to indicate a feedback mode used by the terminal to report the CSI information;

sending, by the base station, the CSI feedback configuration information to the terminal so that the terminal feeds back the coded CSI information according to the CSI feedback configuration information.

In a third aspect, an embodiment of the present application provides a terminal, which includes:

a receiver configured to receive an uplink channel resource configuration signaling and/or a Demodulation Reference Signal, DMRS, configuration signaling sent by a base station, and determine a mapping symbol set according to the uplink channel resource configuration signaling and/or DMRS configuration signaling; wherein the DMRS configuration signaling is used to indicate the quantity of DMRSs configured by a system for an uplink channel and a time-frequency position of an Orthogonal Frequency Division Multiplexing, OFDM, symbol occupied by each DMRS in time-frequency resources carrying the uplink channel, the uplink channel resource configuration signaling is used to indicate time-frequency resources occupied by the uplink channel, and the mapping symbol set is a set of OFDM symbols adjacent to the OFDM symbol in the time-frequency resources;

a processor connected to the receiver and configured to measure a downlink channel, calculate Channel State Information, CSI, according to a measurement result, code the CSI information, and map an information part containing Rank Indication, RI, information in the coded CSI information onto Resource Elements, REs, of at least one OFDM symbol in the mapping symbol set;

a transmitter connected to the processor and configured to report the mapped CSI information.

In a possible implementation, the processor is further configured to:

determine remaining OFDM symbols unmapped in the mapping symbol set and remaining CSI information parts in the coded CSI information other than the information part containing the RI information, and map the remaining CSI information parts onto REs of the remaining OFDM symbols for transmission and/or onto REs of OFDM symbols other than the OFDM symbols contained in the mapping symbol set in the time-frequency resources after coding the CSI information and mapping the information part containing the RI information in the coded CSI information onto the REs corresponding to at least one OFDM symbol in the mapping symbol set for transmission.

In a possible implementation, the processor is further configured to:

determine remaining CSI information parts in the coded CSI information other than the information part containing the RI information, and map the remaining CSI information parts onto REs corresponding to OFDM symbols other than the OFDM symbols contained in the mapping symbol set in the time-frequency resources for transmission after coding the CSI information and mapping the information part containing the RI information in the coded CSI information onto the REs corresponding to at least one OFDM symbol in the mapping symbol set for transmission.

In a possible implementation, the receiver is further configured to:

acquire CSI feedback configuration information sent by the base station, wherein the CSI feedback configuration information is used to indicate a feedback mode configured by the system for the terminal to report the CSI information, and determine an uplink channel used by the CSI information according to the CSI feedback configuration information and a correspondence between feedback modes and uplink channels before the processor codes the CSI information;

the processor is further configured to: code the CSI information according to the determined feedback mode and a correspondence between feedback modes and coding modes; wherein the coding modes include an overall coding mode and a split coding mode.

In a fourth aspect, an embodiment of the present application provides a base station, which includes:

a transmitter configured to send an uplink channel resource configuration signaling and/or a Demodulation Reference Signal, DMRS, configuration signaling to a terminal; wherein the DMRS configuration signaling is used to indicate the quantity of DMRSs configured by a system for an uplink channel and a time-frequency position of an Orthogonal Frequency Division Multiplexing, OFDM, symbol occupied by each DMRS in time-frequency resources carrying the uplink channel, the uplink channel resource configuration signaling is used to indicate time-frequency resources occupied by the uplink channel;

a receiver configured to receive coded Channel State Information, CSI, fed back by the terminal, and obtain Rank Indication, RI, information included in the coded CSI information; wherein an information part including the RI information in the coded CSI information is mapped onto Resource Elements, REs, of at least one OFDM symbol in a mapping symbol set that is a set of OFDM symbols adjacent to the OFDM symbol occupied by the DMRS in the time-frequency resources carrying the uplink channel;

a processor connected to the receiver and transmitter and configured to decode the coded CSI information according to the RI information.

In a possible implementation, the processor is further configured to:

configure CSI feedback configuration information used to indicate a feedback mode used by the terminal to report the CSI information before the receiver receives the coded CSI fed back by the terminal and obtains the RI information included in the coded CSI information;

the transmitter is configured to send the CSI feedback configuration information to the terminal so that the terminal feeds back the coded CSI information according to the CSI feedback configuration information.

In a fifth aspect, an embodiment of the present application provides a terminal, which includes:

a receiving module configured to receive an uplink channel resource configuration signaling and/or a Demodulation Reference Signal, DMRS, configuration signaling sent by a base station, and determine a mapping symbol set according to the uplink channel resource configuration signaling and/or DMRS configuration signaling; wherein the DMRS configuration signaling is used to indicate the quantity of DMRSs configured by a system for an uplink channel and a time-frequency position of an Orthogonal Frequency Division Multiplexing, OFDM, symbol occupied by each DMRS in time-frequency resources carrying the uplink channel, the uplink channel resource configuration signaling is used to indicate time-frequency resources occupied by the uplink channel, and the mapping symbol set is a set of OFDM symbols adjacent to the OFDM symbol in the time-frequency resources;

a measuring module configured to measure a downlink channel and calculate Channel State Information, CSI, according to a measurement result;

a processing module configured to code the CSI information and map an information part containing Rank Indication, RI, information in the coded CSI information onto Resource Elements, REs, of at least one OFDM symbol in the mapping symbol set for transmission.

In a sixth aspect, an embodiment of the present application provides a base station, which includes:

a sending module configured to send an uplink channel resource configuration signaling and/or a Demodulation Reference Signal, DMRS, configuration signaling to a terminal; wherein the DMRS configuration signaling is used to indicate the quantity of DMRSs configured by a system for an uplink channel and a time-frequency position of an Orthogonal Frequency Division Multiplexing, OFDM, symbol occupied by each DMRS in time-frequency resources carrying the uplink channel, the uplink channel resource configuration signaling is used to indicate time-frequency resources occupied by the uplink channel;

a receiving module configured to receive coded Channel State Information, CSI, fed back by the terminal, and obtain Rank Indication, RI, information included in the coded CSI information; wherein an information part including the RI information in the coded CSI information is mapped onto Resource Elements, REs, of at least one OFDM symbol in a mapping symbol set that is a set of OFDM symbols adjacent to the OFDM symbol occupied by the DMRS in the time-frequency resources carrying the uplink channel;

a processing module configured to decode the coded CSI information according to the RI information.

In a seventh aspect, an embodiment of the present application provides a computer device which includes a processor configured, when executing a computer program stored in a memory, to implement the methods as described in the first and second aspects.

In an eighth aspect, an embodiment of the present application provides a computer readable storage medium storing the computer instructions, which cause a computer to perform the methods as described in the first and second aspects when running on the computer.

In the embodiments of the present application, the terminal determines the corresponding mapping symbol set according to the DMRS configuration signaling sent by the base station, so the terminal may preferentially map the information part containing the RI information in the coded CSI information onto at least one OFDM symbol in the mapping symbol set for transmission when reporting the CSI information, to improve the transmission success rate of the RI information, and it is convenient for the base station to decode the received coded CSI information according to the RI information reported by the terminal, thereby improving the decoding accuracy.

DETAILED DESCRIPTION OF THE EMBODIMENTS

Figure 1:
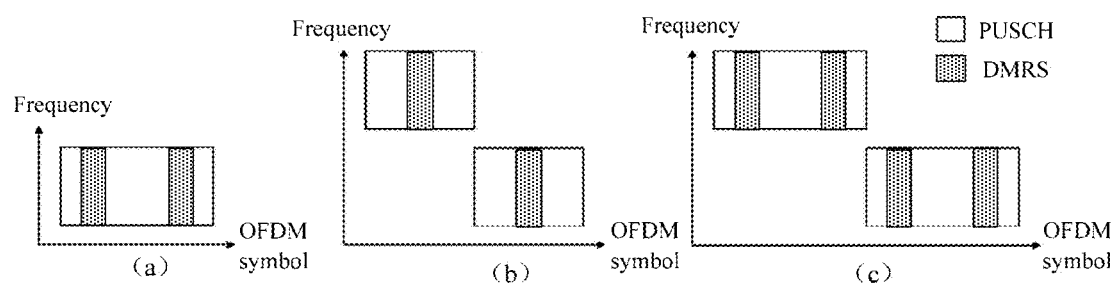
FIG. 1 is a schematic diagram of the DMRS configuration on the PUCCH channel in the NR system in the prior art.

In order to make the objects, technical solutions and advantages of the present application clearer, the present application will be further illustrated below in details with reference to the accompanying figures. The described embodiments are merely a part of the embodiments of the present application but not all the embodiments. Based upon the embodiments of the present application, all of other embodiments obtained by those ordinary skilled in the art without creative work pertain to the protection scope of the present application.

The technical solution described herein may be used in the fifth-generation mobile communication technology (5G) system, and may also be used in the next-generation mobile communication system.

At first, some terms in the embodiments of the present application are explained so as to facilitate the understanding of those skilled in the art.

(1) Base station may refer to a device in the access network that communicates with a terminal through one or more sectors over the air interface. For example, the base station may include the evolutional Node B (NodeB or eNB or e-NodeB) in the Long Term Evolution (LTE) system or LTE-Advanced (LTE-A) system, or may include the next generation node B (gNB) in the 5G system. The base station in the embodiments of the present application mainly refers to the base station in the 5G system.

(2) Terminal may be a device having the wireless communication function. The terminal may receive the downlink data (e.g., CSI-RS) transmitted by the base station, and can report the corresponding data (e.g., CSI) through the uplink channel. The terminal may communicate with the core network via the Radio Access Network (RAN). The terminal may include User Equipment (UE), wireless terminal device, mobile terminal device, subscriber unit, subscriber station, mobile station, mobile, remote station, Access Point (AP), remote terminal, access terminal, user terminal, user agent, or user device, etc. For example, it may include a mobile phone (or called "cellular" phone); a computer with a mobile terminal device; a portable, pocket, handheld, computer built-in or vehicle-carried mobile device; a smart wearable device or the like, e.g., Personal Communication Service (PCS) telephone, cordless telephone, Session Initiation Protocol (SIP) telephone, Wireless Local Loop (WLL) station, Personal Digital Assistant (PDA), smart watch, smart helmet, smart glasses, smart bracelet, and other devices. It also includes limited devices, e.g., device with lower power consumption, device with limited storage capability, or device with limited computing capability or the like, e.g., includes the bar code, Radio Frequency Identification (RFID) sensor, Global Positioning System (GPS), laser scanner and other information sensing devices.

(3) Uplink channel is used by the terminal to transmit the data to the base station, e.g., report the CSI information or the like. In the embodiments of the present application, the uplink channel may refer to PUCCH channel or PUSCH channel.

Next, the common structure of the uplink channel in the NR system will be illustrated.

1. PUCCH Channel

The short PUCCH channel and long PUCCH channel are defined in the NR system, wherein the short PUCCH channel contains 1-2 OFDM symbols. When the CSI information is transmitted, the DMRS is configured on each OFDM symbol, that is to say, one DMRS may be configured on each OFDM symbol in the time-frequency resources occupied by the PUCCH. The long PUCCH channel contains 4-14 OFDM symbols, and the long PUCCH channel may be divided into two structures: frequency hopping and non-frequency hopping, according to the number of the OFDM symbols.

The non-frequency hopping PUCCH contains two DMRS symbols, as shown in (a) of FIG. 1. For the frequency-hopping PUCCH, each frequency-hopping part may further include 1 DMRS symbol according to the number of the OFDM symbols in each frequency-hopping part, as shown in (b) of FIG. 1, or each frequency-hopping part can also include two DMRS symbols, as shown in (c) of FIG. 1.

2. PUSCH Channel

Figure 2:
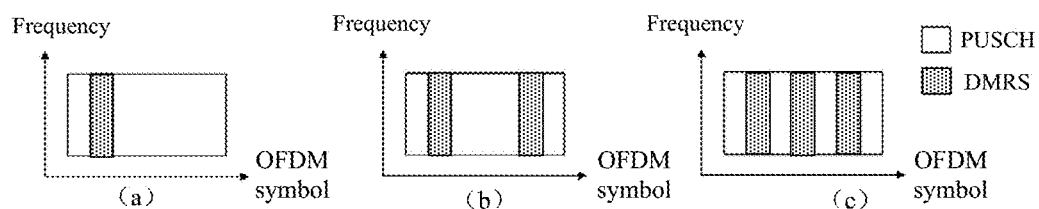
FIG. 2 is a schematic diagram of the DMRS configuration on the PUSCH channel in the NR system in the prior art.

In the structure of the PUSCH channel, the system may further add one or two groups of additional DMRSs in addition to the front-loaded DMRS according to the user's mobile speed and other application scenarios, as shown in FIG. 2.

In order for the better understanding of the above-mentioned technical solution, the above-mentioned technical solution will be illustrated below in details in combination with the drawings of the specification and the specific embodiments.

First Embodiment

Figure 3:
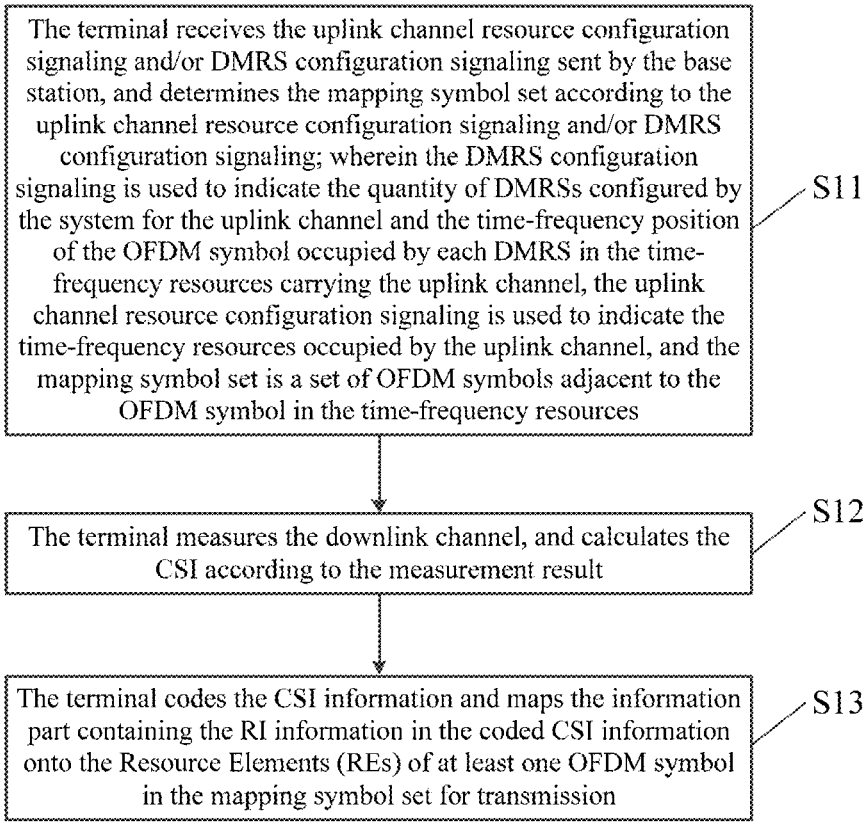
FIG. 3 is a flow chart of a method of reporting the CSI information in an embodiment of the present application.

An embodiment of the present application provides a method of reporting the CSI information that can be applied to a terminal, to enable the terminal to perform the data transmission with a base station. As shown in FIG. 3, the method may be described as follows.

S11: the terminal receives the uplink channel resource configuration signaling and/or DMRS configuration signaling sent by the base station, and determines the mapping symbol set according to the uplink channel resource configuration signaling and/or DMRS configuration signaling; wherein the DMRS configuration signaling is used to indicate the quantity of DMRSs configured by the system for the uplink channel and the time-frequency position of the OFDM symbol occupied by each DMRS in the time-frequency resources carrying the uplink channel, the uplink channel resource configuration signaling is used to indicate the time-frequency resources occupied by the uplink channel, and the mapping symbol set is a set of OFDM symbols adjacent to the OFDM symbol in the time-frequency resources.

Specifically, after receiving the uplink channel resource configuration signaling and/or DMRS configuration signaling sent by the base station, the terminal may determine the DMRS configuration of the system for the uplink channel, for example, determine the quantity of DMRSs in the PUCCH channel (or PUSCH channel), and determine the position of the OFDM symbol occupied by each DMRS in the time-frequency resources bearing the PUCCH channel.

Here, the uplink channel resource configuration signaling may refer to the PUSCH resource configuration signaling or PUCCH configuration signaling, then the PUSCH resource configuration signaling may indicate the time-frequency resources occupied by the PUSCH channel, and the PUCCH configuration signaling may indicate the time-frequency resources occupied by the PUCCH channel.

Figure 4A:
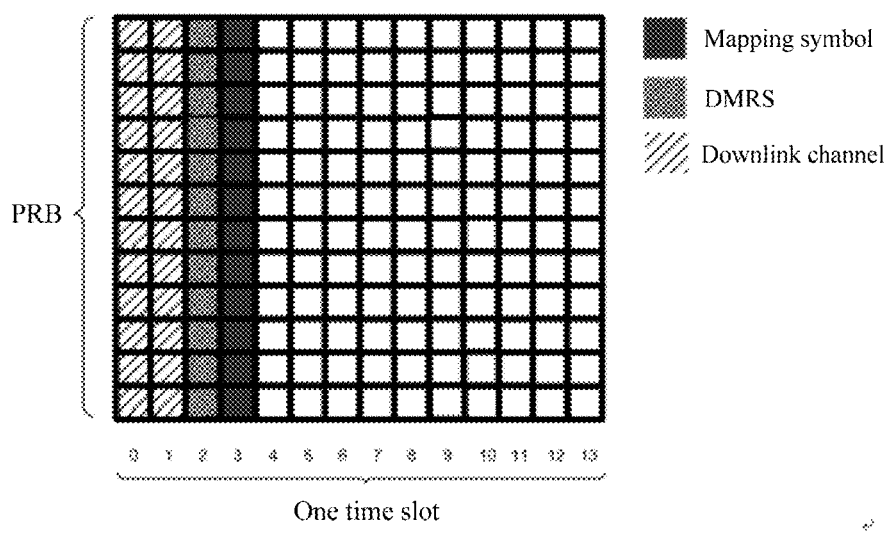
FIGS. 4A-4C are schematic diagrams of the mapping symbol set in the PUSCH channel in an embodiment of the present application.
Figure 4B:
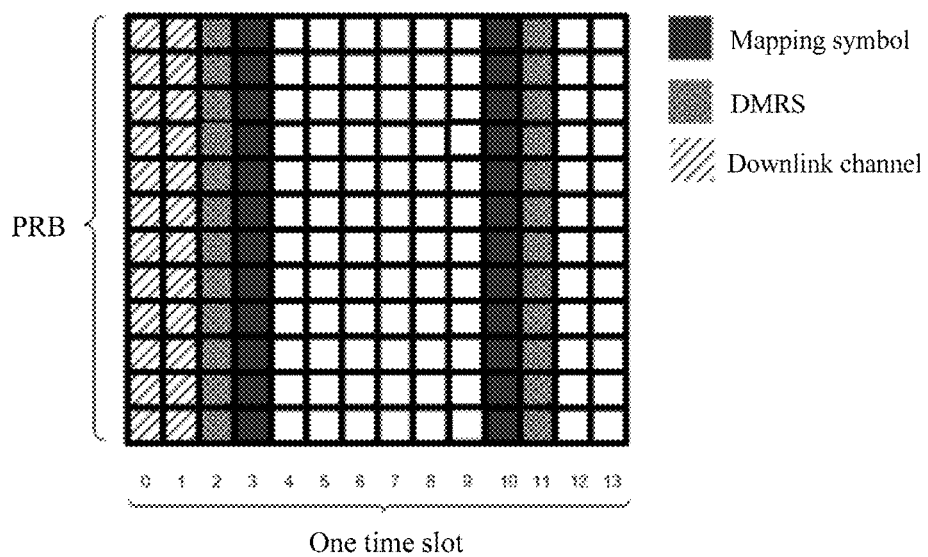
Figure 4C:
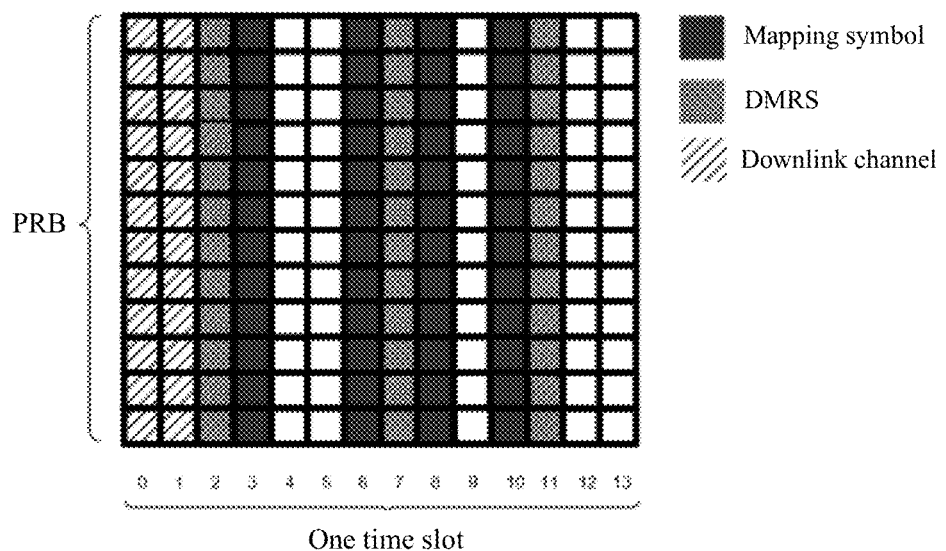

Further, the terminal may determine the OFDM symbols at one or both sides adjacent to the OFDM symbol occupied by each DMRS in the time-frequency resources as the mapping symbols according to the system's predefinition, and the set of all the mapping symbols is the mapping symbol set. For example, FIGS. 4A-4C show three types of DMRS configurations of the system for the PUSCH channel, and the mapping symbol set corresponding to each type of DMRS configuration, wherein FIG. 4A shows the front-loaded DMRS, FIG. 4B shows the front-loaded DMRS and a group of additional DMRSs, and FIG. 4C shows the front-loaded DMRS and two groups of additional DMRSs. One Physical Resource Block (PRB) is shown in each of the above figures.

S12: the terminal measures the downlink channel, and calculates the CSI according to the measurement result.

In an embodiment of the present application, the terminal may perform the channel measurement on the downlink channel, that is, measure the CQI, PMI, Rank Indexes (RI) and other information of the downlink channel, and then obtain the CSI information including the RI, PMI, CQI and other information.

Of course, in the practical applications, the CSI information may further include the resource indication information CRI of the Channel State Indication-Reference Signal (CSI-RS).

In an embodiment of the present application, the terminal may further obtain the CSI feedback configuration information sent by the base station, where the CSI feedback configuration information may be used to indicate the feedback mode configured by the base station and used by the terminal when reporting the CSI information, for example, using the Type I codebook or Type II codebook, using the periodic, semi-persistent or non-periodic feedback, using the wideband feedback or subband feedback, and so on.

Then the terminal may determine the uplink channel used by the CSI information in this feedback according to the received CSI feedback configuration information and the correspondence between feedback modes and uplink channels.

S13: the terminal codes the CSI information and maps the information part containing the RI information in the coded CSI information onto the Resource Element (RE) of at least one OFDM symbol in the mapping symbol set for transmission.

In this step, the terminal may code the CSI information according to the determined feedback mode and the correspondence between feedback modes and coding modes, where the coding modes include the overall coding mode and the split coding mode. That is, according to the different feedback modes of the configured CSI information, the CSI information may be coded and fed back as a whole, or the CSI information may be divided into two or more information parts which are coded respectively and then the transmission feedback is performed.

The common coding modes of the CSI information include but are not limited to the following cases:

First case: for the feedback of the PUCCH channel (mainly, the long PUCCH channel), there are two coding modes, including:

1. the terminal performs joint coding on the CSI information as a whole;
2. the terminal divides the CSI information into two information parts for independent coding, with one information part being the RI/CRI joint coding and the other information part being the PMI/CQI joint coding.

Second case: for the PUSCH information feedback, the terminal may determine the corresponding coding mode according to the type of codebook that is fed back:

1. for the type I codebook (i.e., Type I codebook), the terminal may divide the CSI information into two information parts for separately coding, with one information part is the RI/CRI and the CQI of the first codeword joint coding and the other information part is the PMI and the CQI of the second codeword joint coding;
2. for the type II codebook (i.e., Type II codebook), the terminal divides the CSI information into two or three information parts, and codes each information part independently. For example, if the terminal divides the CSI information into three information parts, the first information part is usually the RI/CQI joint coding, the second information part is the wideband amplitude information joint coding, and the third information part is the PMI joint coding.

In S13, after completing the coding of the CSI information, the terminal may map the coded CSI information onto the OFDM symbols contained in the time-frequency resources carrying the uplink channel, to report the CSI information to the base station.

Specifically, when mapping and transmitting the coded CSI information in the uplink channel, the terminal may preferentially map the information part including the RI information in the coded CSI information onto the REs corresponding to the OFDM symbols in the mapping symbol set, which will be illustrated below respectively in different case:

First case: if the terminal adopts the mode in which joint coding is performed on the complete CSI information as a whole in this report.

Then the terminal may preferentially map the jointly coded CSI information onto one, more or all OFDM symbols in the mapping symbol set. Further, the terminal may map the remaining coded CSI information that is unmapped onto the remaining OFDM symbols of the uplink channel.

Second case: if the terminal adopts the mode in which the complete CSI information is divided into multiple information parts and each information part is coded separately in this report.

Then the terminal may preferentially map the information part containing the RI information in the coded CSI information onto one, more or all OFDM symbols in the mapping symbol set.

Further, if the terminal determines that there are still remaining resources (RE) in the mapping symbol set, i.e., the REs of the remaining OFDM symbols, then the terminal may map other information parts of the coded CSI information onto the remaining resources for transmission, and/ or onto the REs of OFDM symbols other than the OFDM symbols contained in the mapping symbol set in the time-frequency resources for transmission.

For example, information parts other than the information part containing the RI information in the coded CSI information may be preferentially mapped onto the remaining resources in the mapping symbol set. If other information parts further have the remaining CSI information, the remaining CSI information may be further mapped onto the remaining OFDM symbols of the uplink channel. Alternatively, in the case when there are the remaining resources in the mapping symbol set, all the other information parts may also be mapped onto OFDM symbols other than the mapping symbol set in the time-frequency resources carrying the uplink channel, e.g., other OFDM symbols adjacent to the OFDM symbol occupied by the DMRS in the time-frequency resources.

Therefore, in the embodiment of the present application, the terminal can effectively improve the success rate of transmitting the RI information by preferentially mapping the RI information in the CSI information onto the REs of the OFDM symbol in the mapping symbol set with higher reliability, and since the RI information may be used to indicate the number of streams during the user data transmission, it facilitates the increase in the accuracy of decoding the CSI information by the base station.

The application scenarios of the embodiments of the present application will be illustrated below by way of the specific examples.

First Scenario

It is assumed that the terminal determines that the configuration of the DMRS in the uplink channel is the structure as shown in FIG. 4B according to the received PUSCH resource configuration signaling and DMRS configuration signaling, that is, one front-loaded DMRS and a group of additional DMRSs are configured on the PUSCH channel, and the base station triggers the terminal to feed back the non-periodic Type II CSI through the DCI signaling.

Firstly, the terminal may determine the mapping symbol set after receiving the PUSCH resource configuration signaling and the DMRS configuration signaling sent by the base station, please still referring to FIG. 4B.

Then, the terminal determines that the current feedback mode is to perform the non-periodic Type II CSI feedback on the PUSCH channel according to the CSI feedback configuration information of the base station.

Further, the terminal calculates the complete Type II CSI information including the RI/PMI/CQI according to the channel measurement result of the downlink channel. The terminal determines that the CSI information is divided into three parts at this time according to the feedback mode, wherein the first part includes the RI/CQI and this part is coded; the second part includes the wideband amplitude information in the PMI and this part is coded; and the third part includes the remaining PMI information except the wideband amplitude information and this part is coded.

Since the first part contains the RI information, the terminal may preferentially map the coded first part onto the REs of the OFDMs in the mapping symbol set, e.g., onto the mapping symbol 3 (i.e., the REs corresponding to the OFDM symbol numbered 3, and such words appearing in the following have the same meaning) and the mapping symbol 10 in FIG. 4B, when the terminal maps the coded CSI information.

When the first part is mapped in the mapping symbol set, the mapping mode of the frequency domain before time domain may also be adopted, that is, firstly the mapping is performed on the OFDM symbol 3, and after the whole REs of this symbol is fully occupied, the mapping continues to be performed on the REs of the OFDM symbol 10; or the mapping mode of the time domain before frequency domain may also be adopted, that is, in accordance with the order of subcarriers, each subcarrier is firstly mapped onto the REs of the OFDM symbol 3 and then onto the REs of the OFDM symbol 10.

Further, the terminal may map the coded second part of CSI information and third part of CSI information onto the OFDM symbol 12, symbol 13, and symbols 4-9 sequentially. Here firstly mapping onto the symbol 12 is because it is next to the DMRS symbol.

Here, if there are still remaining REs unoccupied on the symbol 3 or symbol 10 after the terminal completes the mapping of the coded first part in the mapping symbol set, this part of resources may not be used.

Finally, the terminal reports the CSI information mapped on the PUSCH channel.

Second Scenario

Figure 5A:
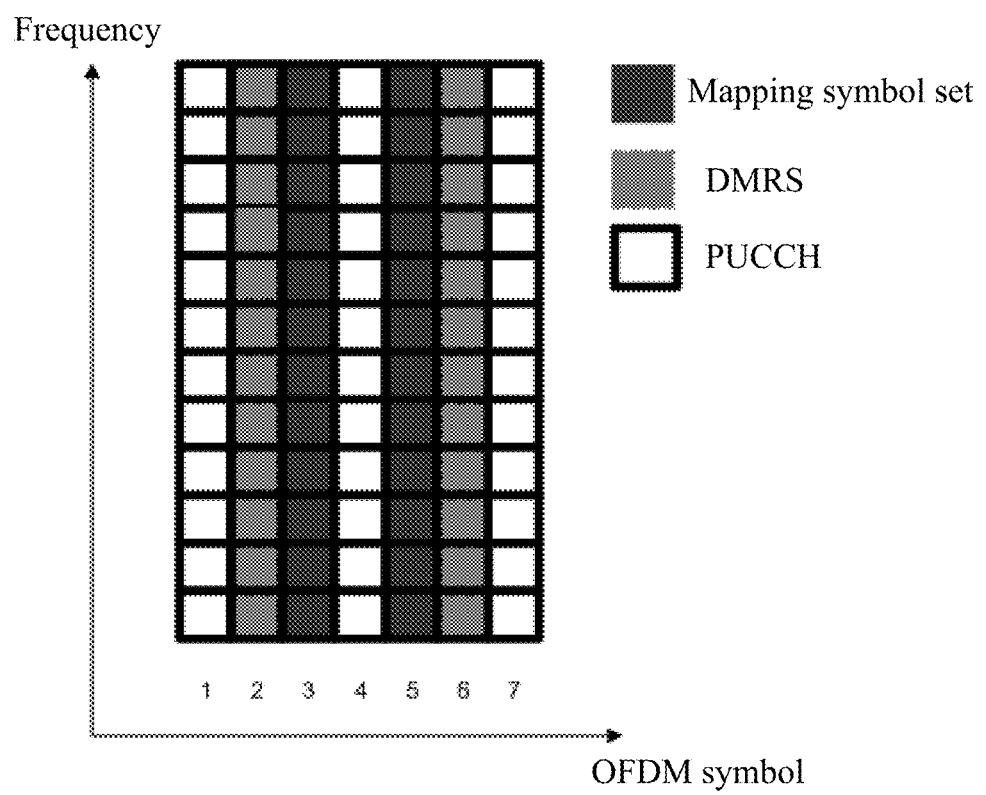
FIGS. 5A-5C are schematic diagrams of the mapping symbol set in the PUCCH channel in an embodiment of the present application.
Figure 5B:
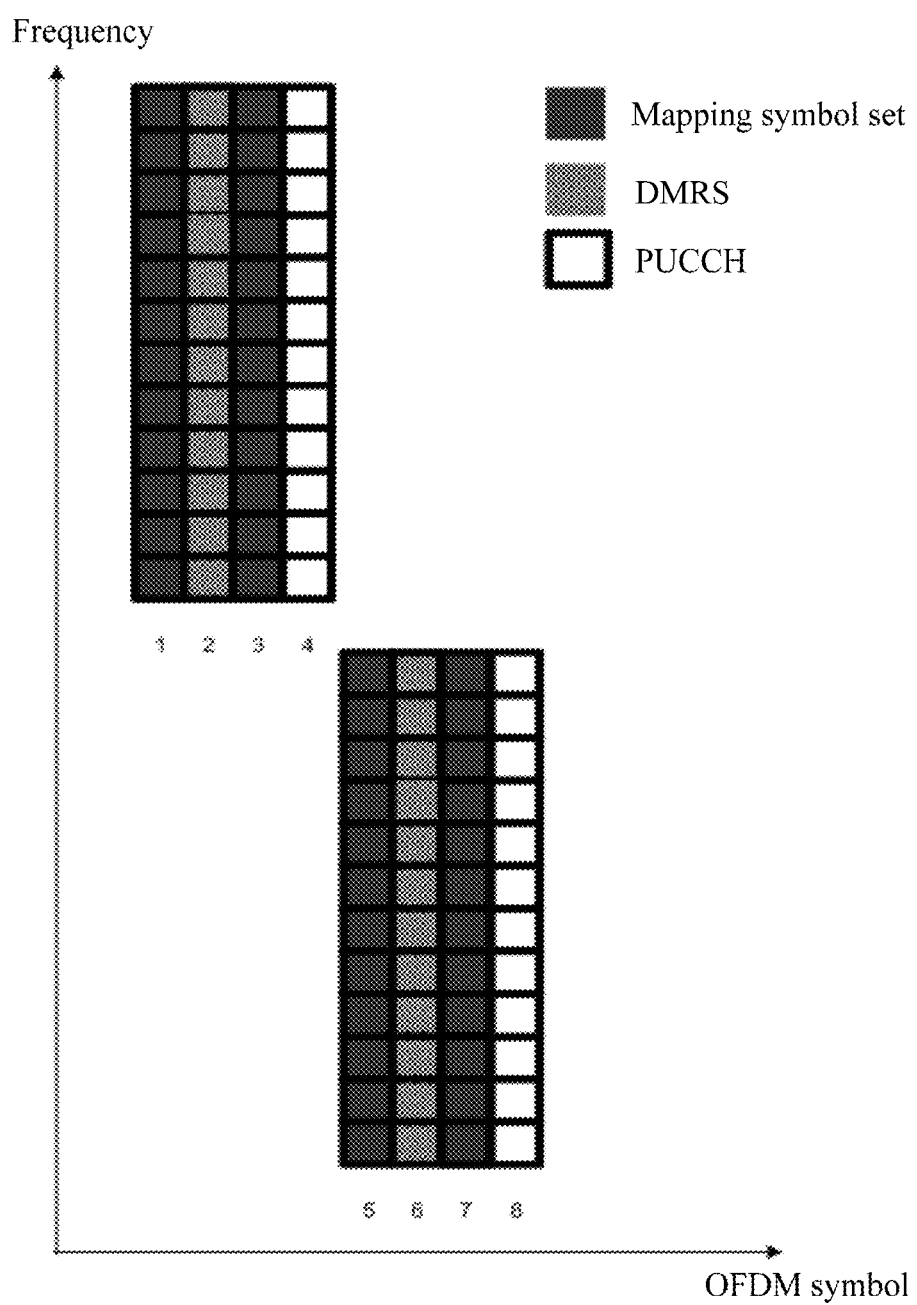
Figure 5C:
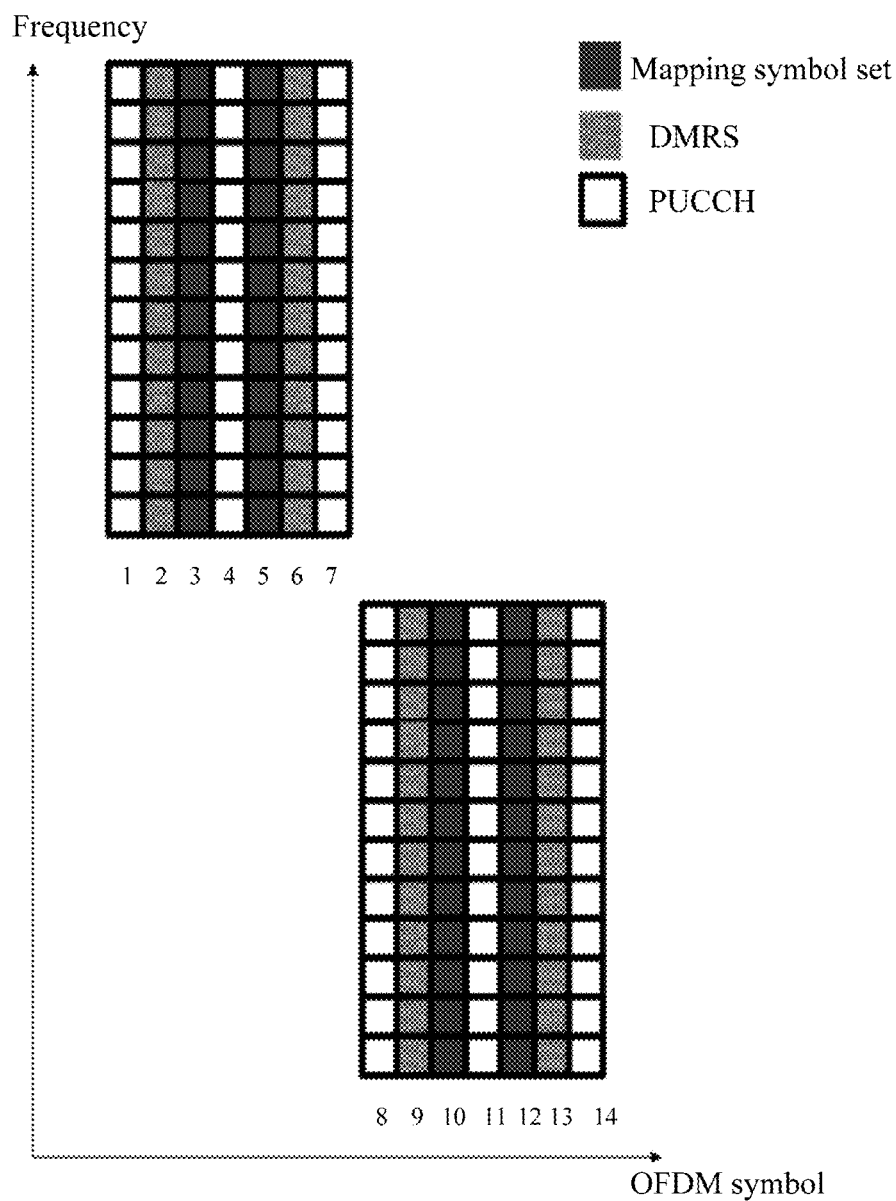

It is assumed that the system predefines three types of DMRS configurations as shown in FIGS. 5A-5C for each DMRS configuration of the long PUCCH, and the figure shows the mapping symbol set corresponding to each DMRS configuration, wherein FIG. 5A shows the non-frequency hopping structure, FIG. 5B shows frequency hopping—the number of small symbols per frequency hopping, and FIG. 5C shows frequency hopping—the number of large symbols per frequency hopping.

It should be noted that, unlike FIGS. 4A-4C, the OFDM symbols here are only used to represent the first to last symbols of the PUCCH region, i.e., play a numbering role, instead of the symbol indexes in one time slot.

If the terminal determines that the base station configures the long PUCCH of 8 OFDM symbols for the terminal according to the received PUCCH configuration signaling, the frequency hopping method is adopted, where 4 OFDM symbols are included on each frequency hopping, and only one DMRS symbol is included on each frequency hopping, as shown in FIG. 5B. And the terminal determines the Type I CSI of the feedback period configured by the base station for the terminal through the CSI feedback configuration information.

For the terminal, the terminal firstly receives the PUCCH configuration signaling sent by the base station and determines the mapping symbol set, please still referring to FIG. 5B.

Then the terminal determines that the current feedback mode is the sub-band periodic Type I CSI feedback according to the CSI feedback configuration information of the base station, and determines that the feedback is performed on the long PUCCH channel according to the correspondence between feedback modes and uplink channels predefined by the system.

Further, the terminal performs the channel measurement and calculates the complete Type I CSI information including the RI/CRI/PMI/CQI. The terminal determines that the CSI information is divided into two parts according to the feedback mode, where the first part includes the RI/CRI and the CQI of the first codeword, and this part is coded; and the second part includes the PMI and the CQI of the second codeword, and this part is coded.

Since the first part contains the RI information, the terminal may map the coded first part onto the mapping symbols 1, 3, 5 and 7 in FIG. 5B. When performing the resource mapping, the terminal may adopt the mapping mode of frequency domain before time domain, or the mapping mode of time domain before the frequency domain.

It is assumed that the terminal determines that there are still remaining REs unoccupied on the mapping symbol 1, 3, 5, or 7 after the mapping of the coded first part is completed, then the coded second part of CSI information may be mapped onto these remaining REs, and the remaining part of the coded second part of CSI information is then mapped onto the symbols 4 and 8.

Finally, the terminal reports the CSI information mapped on the PUCCH channel.

Second Embodiment

Figure 6:
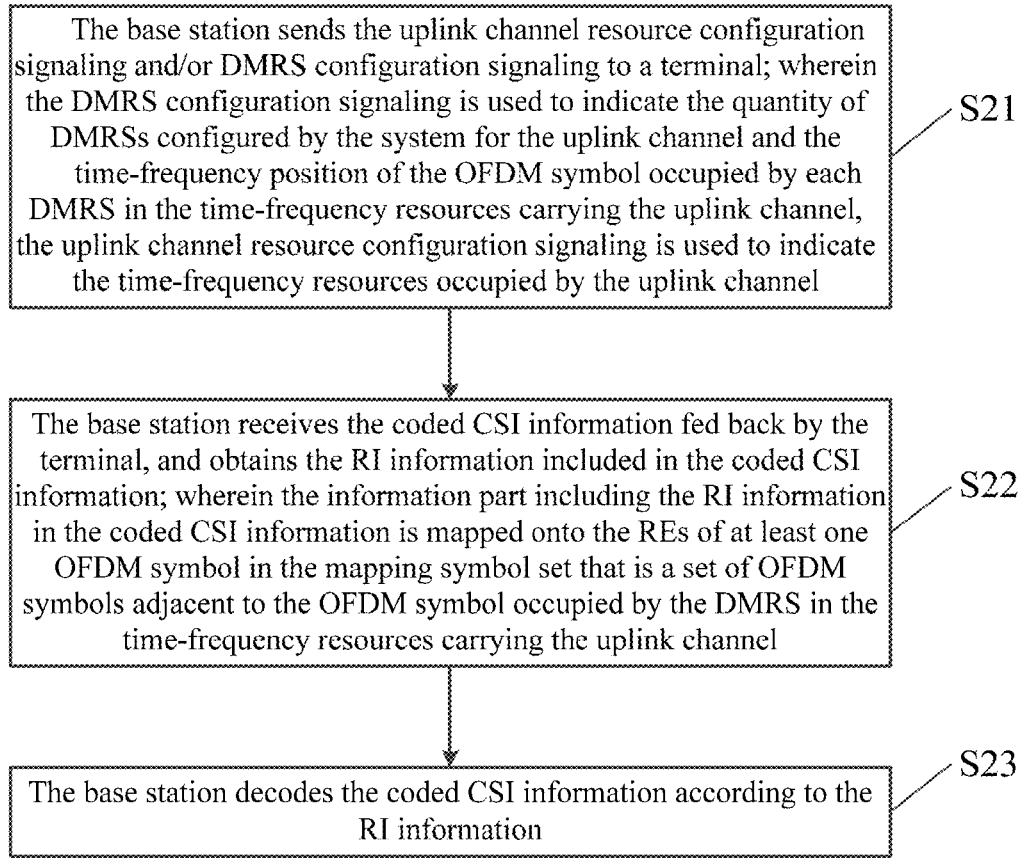
FIG. 6 is a flow chart of a method of receiving the CSI information in an embodiment of the present application.

As shown in FIG. 6, an embodiment of the present application provides a method of receiving the CSI information, which may be applied to a base station and include the steps of:

S21: the base station sends the uplink channel resource configuration signaling and/or DMRS configuration signaling to a terminal; wherein the DMRS configuration signaling is used to indicate the quantity of DMRSs configured by the system for the uplink channel and the time-frequency position of the OFDM symbol occupied by each DMRS in the time-frequency resources carrying the uplink channel, the uplink channel resource configuration signaling is used to indicate the time-frequency resources occupied by the uplink channel.

Specifically, the uplink channel configuration signaling and/or DMRS configuration signaling may instruct the terminal to configure one front-loaded DMRS and a group of additional DMRSs on the PUSCH channel, i.e., the configuration shown in FIG. 4B, or may also instruct the terminal to configure the long PUCCH of 8 OFDM symbols and adopt the frequency hopping mode, where 4 OFDM symbols are included on each frequency hopping, and only one DMRS symbol is included on each frequency hopping, i.e., the configuration shown in FIG. 5B.

Therefore, the base station sends the uplink channel configuration signaling and/or DMRS configuration signaling to the terminal through the downlink channel, so that the terminal learns the DMRS configuration of the uplink channel indicated by the base station to feed back the CSI information, and performs the corresponding operations (e.g., triggers the terminal to determine the mapping symbol set) according to the received uplink channel configuration signaling and/or DMRS configuration signaling.

S22: the base station receives the coded CSI information fed back by the terminal, and obtains the RI information included in the coded CSI information; wherein the information part including the RI information in the coded CSI information is mapped onto the REs of at least one OFDM symbol in the mapping symbol set that is a set of OFDM symbols adjacent to the OFDM symbol occupied by the DMRS in the time-frequency resources carrying the uplink channel.

Before S22, the base station may further configure the CSI feedback configuration information used to indicate the feedback mode used by the terminal to report the CSI information, and sends the CSI feedback configuration information to the terminal.

S23: the base station decodes the coded CSI information according to the RI information.

In the embodiment of the present application, the RI information included in the CSI information received by the base station may be used to indicate the number of streams during the user data transmission, which facilitates the increase in the accuracy of decoding the CSI information.

Third Embodiment

Figure 7:
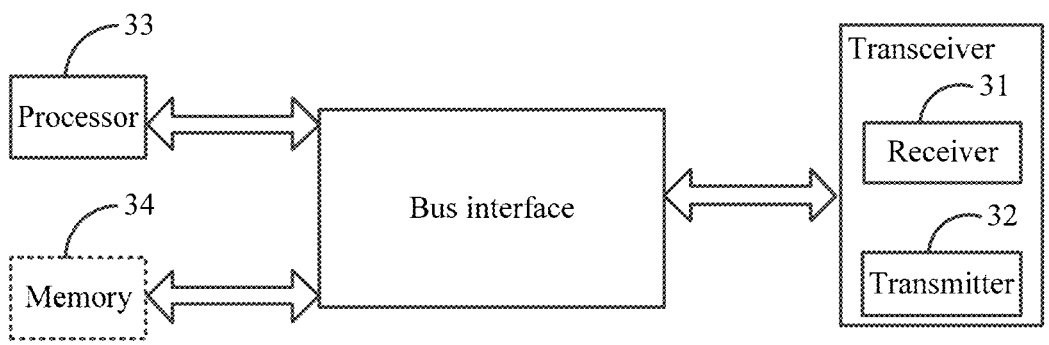
FIG. 7 is a structural schematic diagram of a terminal in an embodiment of the present application.

Based on the same inventive concept, an embodiment of the present application provides a terminal that can be used to perform the method of reporting the CSI information as shown in FIG. 3. As shown in FIG. 7, the terminal includes a receiver 31, a processor 33, and a transmitter 32.

In the practical applications, the receiver 31 and the transmitter 32 are usually arranged in the same device, e.g., a transceiver, so these two components are the components in the transceiver in FIG. 7 as an example.

In addition, the terminal may further include a memory 34 shown by the dotted line in FIG. 7. The memory 34 may be used to store various data in the terminal, e.g., storing the CSI information and the like.

The receiver 31 may be configured to receive the uplink channel resource configuration signaling and/or DMRS configuration signaling sent by a base station, and determine the mapping symbol set according to the uplink channel resource configuration signaling and/or DMRS configuration signaling; wherein the DMRS configuration signaling is used to indicate the quantity of DMRSs configured by the system for the uplink channel and the time-frequency position of the OFDM symbol occupied by each DMRS in the time-frequency resources carrying the uplink channel, the uplink channel resource configuration signaling is used to indicate the time-frequency resources occupied by the uplink channel, and the mapping symbol set is a set of OFDM symbols adjacent to the OFDM symbol in the time-frequency resources.

The processor 33 is connected to the receiver 31 and configured to measure the downlink channel, calculate the CSI according to the measurement result, code the CSI information, and map the information part containing the RI information in the coded CSI information onto the REs of at least one OFDM symbol in the mapping symbol set.

The transmitter 32 may be connected to the processor 33 and the receiver 31 respectively and configured to report the mapped CSI information.

In one embodiment, the processor 33 is further configured to:

determine the remaining OFDM symbols unmapped in the mapping symbol set and the remaining CSI information parts in the coded CSI information other than the information part containing the RI information, and map the remaining CSI information parts onto the REs of the remaining OFDM symbols for transmission and/or onto the REs of OFDM symbols other than the OFDM symbols contained in the mapping symbol set in the time-frequency resources after coding the CSI information and mapping the information part containing the RI information in the coded CSI information onto the REs corresponding to at least one OFDM symbol in the mapping symbol set for transmission.

In one embodiment, the processor 33 is further configured to:

determine the remaining CSI information parts in the coded CSI information other than the information part containing the RI information, and map the remaining CSI information parts onto the REs corresponding to OFDM symbols other than the OFDM symbols contained in the mapping symbol set in the time-frequency resources for transmission after coding the CSI information and mapping the information part containing the RI information in the coded CSI information onto the REs corresponding to at least one OFDM symbol in the mapping symbol set for transmission.

In one embodiment, the receiver 31 is further configured to:

acquire the CSI feedback configuration information sent by the base station, wherein the CSI feedback configuration information is used to indicate the feedback mode configured by the system for the terminal to report the CSI information, and determine the uplink channel used by the CSI information according to the CSI feedback configuration information and the correspondence between feedback modes and uplink channels before the processor codes the CSI information;

The processor 33 is further configured to: code the CSI information according to the determined feedback mode and the correspondence between feedback modes and coding modes; where the coding modes include the overall coding mode and the split coding mode.

Fourth Embodiment

Figure 8:
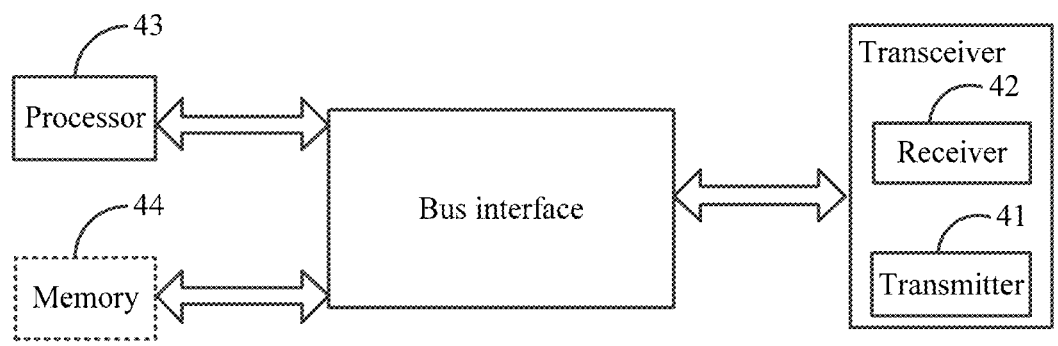
FIG. 8 is a structural schematic diagram of a base station in an embodiment of the present application.

As shown in FIG. 8, based on the same inventive concept, an embodiment of the present application provides a base station that can be used to perform the method of receiving the CSI information as shown in FIG. 6. The base station includes a transmitter 41, a receiver 42, and a processor 43.

In the practical applications, the receiver 42 and the transmitter 41 are usually arranged in the same device, e.g., a transceiver, so these two components are the components in the transceiver in FIG. 8 as an example.

In addition, the terminal may further include a memory 44 shown by the dotted line in FIG. 8. The memory 44 may be used to store various data in the base station, e.g., storing the DMRS configuration or received CSI information or the like.

The transmitter 44 is configured to send the uplink channel resource configuration signaling and/or DMRS configuration signaling to a terminal; wherein the DMRS configuration signaling is used to indicate the quantity of DMRSs configured by the system for the uplink channel and the time-frequency position of the OFDM symbol occupied by each DMRS in the time-frequency resources carrying the uplink channel, the uplink channel resource configuration signaling is used to indicate the time-frequency resources occupied by the uplink channel.

The receiver 42 is configured to receive the coded CSI fed back by the terminal, and obtain the RI information included in the coded CSI information; wherein the information part including the RI information in the coded CSI information is mapped onto the REs of at least one OFDM symbol in the mapping symbol set that is a set of OFDM symbols adjacent to the OFDM symbol occupied by the DMRS in the time-frequency resources carrying the uplink channel.

The processor 43 is connected to the receiver 42 and transmitter 41 and configured to decode the coded CSI information according to the RI information.

In one embodiment, the processor 43 is further configured to:

configure the CSI feedback configuration information used to indicate the feedback mode used by the terminal to report the CSI information before the receiver 42 receives the coded CSI fed back by the terminal and obtains the RI information included in the coded CSI information.

The transmitter 41 is further configured to send the CSI feedback configuration information to the terminal.

Fifth Embodiment

Figure 9:
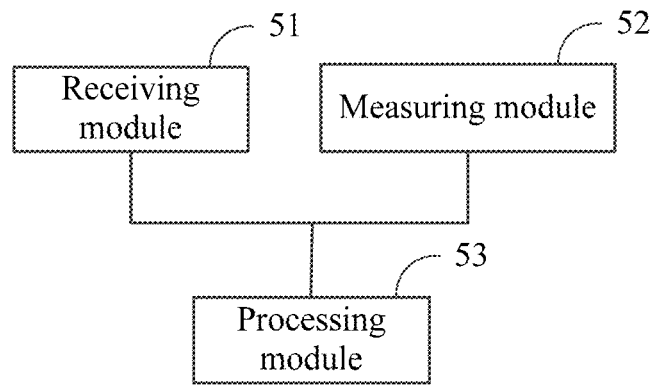
FIG. 9 is a schematic module diagram of a terminal in an embodiment of the present application.

As shown in FIG. 9, an embodiment of the present application provides a terminal that can be used to perform the method of reporting the CSI information shown in FIG. 3. The terminal includes a receiving module 51, a measuring module 52 and a processing module 53.

The receiving module 51 is configured to receive the uplink channel resource configuration signaling and/or DMRS configuration signaling sent by a base station, and determine the mapping symbol set according to the uplink channel resource configuration signaling and/or DMRS configuration signaling; wherein the DMRS configuration signaling is used to indicate the quantity of DMRSs configured by the system for the uplink channel and the time-frequency position of the OFDM symbol occupied by each DMRS in the time-frequency resources carrying the uplink channel, and the mapping symbol set is a set of OFDM symbols adjacent to the OFDM symbol in the time-frequency resources.

The measuring module 52 is configured to measure the downlink channel and calculate the CSI according to the measurement result.

The processing module 53 is configured to code the CSI information and map the information part containing the RI information in the coded CSI information onto the REs of at least one OFDM symbol in the mapping symbol set for transmission.

In one embodiment, the processing module 53 is further configured to: determine the remaining OFDM symbols unmapped in the mapping symbol set and the remaining CSI information parts in the coded CSI information other than the information part containing the RI information after coding the CSI information and mapping the information part containing the RI information in the coded CSI information onto the REs corresponding to at least one OFDM symbol in the mapping symbol set for transmission;

and map the remaining CSI information parts onto the REs of the remaining OFDM symbols for transmission, and/or onto the REs of OFDM symbols other than the OFDM symbols contained in the mapping symbol set in the time-frequency resources for transmission.

In one embodiment, the processing module 53 is further configured to: determine the remaining CSI information parts in the coded CSI information other than the information part containing the RI information after coding the CSI information and mapping the information part containing the RI information in the coded CSI information onto the REs of at least one OFDM symbol in the mapping symbol set for transmission;

and map the remaining CSI information parts onto the REs corresponding to OFDM symbols other than the OFDM symbols contained in the mapping symbol set in the time-frequency resources for transmission.

In one embodiment, the receiving module 51 is further configured to acquire the CSI feedback configuration information sent by the base station, wherein the CSI feedback configuration information is used to indicate the feedback mode configured by the system for the terminal to report the CSI information, and determine the uplink channel used by the CSI information according to the CSI feedback configuration information and the correspondence between feedback modes and uplink channels before the terminal codes the CSI information.

The processing module 53 is configured to code the CSI information according to the feedback mode determined by the receiving module 51 and the correspondence between feedback modes and coding modes; wherein the coding modes include the overall coding mode and the split coding mode.

Sixth Embodiment

Figure 10:
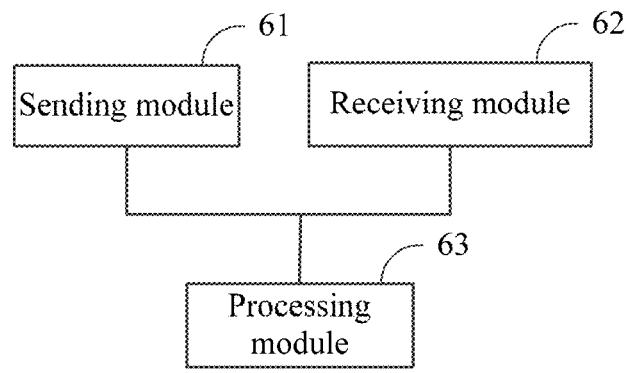
FIG. 10 is a schematic module diagram of a base station in an embodiment of the present application.

As shown in FIG. 10, an embodiment of the present application provides a base station that can be used to perform the method of receiving the CSI information shown in FIG. 6. The base station includes a sending module 61, a receiving module 62 and a processing module 63.

The sending module 61 may be configured to send the uplink channel resource configuration signaling and/or DMRS configuration signaling to a terminal; wherein the DMRS configuration signaling is used to indicate the quantity of DMRSs configured by the system for the uplink channel and the time-frequency position of the OFDM symbol occupied by each DMRS in the time-frequency resources carrying the uplink channel, the uplink channel resource configuration signaling is used to indicate the time-frequency resources occupied by the uplink channel.

The receiving module 62 may be configured to receive the coded CSI fed back by the terminal, and obtain the RI information included in the coded CSI information; wherein the information part including the RI information in the coded CSI information is mapped onto the REs of at least one OFDM symbol in the mapping symbol set that is a set of OFDM symbols adjacent to the OFDM symbol occupied by the DMRS in the time-frequency resources carrying the uplink channel.

The processing module 63 may be configured to decode the coded CSI information according to the RI information.

In one embodiment, before the receiving module 62 receives the coded CSI fed back by the terminal and obtains the RI information included in the coded CSI information, the processing module 63 is further configured to configure the CSI feedback configuration information used to indicate the feedback mode used by the terminal to report the CSI information.

The sending module 61 is configured to send the CSI feedback configuration information to the terminal.

Seventh Embodiment

Figure 11:
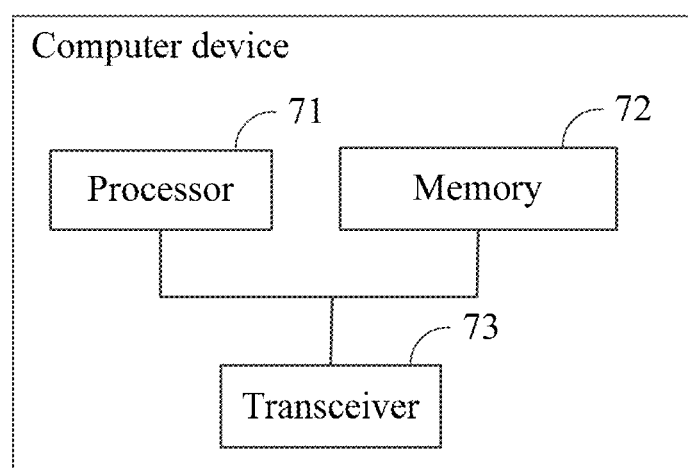
FIG. 11 is a structural schematic diagram of a computer device in an embodiment of the present application.

An embodiment of the present application further provides a computer device, as shown in FIG. 11, which includes a processor 71, a memory 72 and a transceiver 73 which may be connected by a bus, wherein the transceiver 73 receives and sends the data under the control of the processor 71, e.g., sends/receives the CSI information or the like, the memory 72 stores the preset programs therein, and the processor 71 is configured to implement the steps of the methods provided in the first and second embodiments of the present application when executing the computer program stored in the memory 72.

In one embodiment, the processor 71 may specifically be a central processor, an Application Specific Integrated Circuit (ASIC), one or more integrated circuits for controlling the program execution, a hardware circuit developed by using the Field Programmable Gate Array (FPGA), a baseband processor.

In one embodiment, the processor 71 may include at least one processing core.

In one embodiment, the memory 72 of the electronic device may include a Read Only Memory (ROM), a Random Access Memory (RAM), and a magnetic disk memory. The memory 72 is configured to store the data required by the processor 71 when running. The number of memories 72 is one or more.

Eighth Embodiment

An embodiment of the present application further provides a computer readable storage medium storing the computer instructions, which may implement the steps of the pilot configuration method provided in the first embodiment of the present application and of the channel measurement method of the second embodiment when running on the computer.

In the embodiment of the present application, it should be understood that the disclosed network traffic monitoring method and network traffic monitoring system may be implemented in other ways. For example, the device embodiments described above are only schematic, for example, the division of units is merely a logical function division. In an actual implementation, there may be other division manners, for example, a plurality of units or components may be combined or integrated to another system, or some features may be ignored or not performed. In addition, the displayed or discussed mutual coupling or direct coupling or communication connection may be implemented through the indirect coupling or communication connection between some interfaces, devices or units, and may be in the electrical or other forms.

In the embodiment of the present application, various functional units may be integrated into one processing unit, or various units may also be independent physical modules.

When the integrated unit is implemented in the form of software functional unit and sold or used as an independent product, it may be stored in a computer readable storage medium. Based on such understanding, all or a part of the technical solution of the embodiment of the present application may be embodied in the form of software product. The computer software product is stored in a storage medium, and includes several instructions used to enable a computer device (which may be, for example, personal computer, server, network device or the like) or a processor to perform all or some of the steps of the methods of various embodiments of the present application. The above-mentioned storage medium includes: Universal Serial Bus (USB) flash drive, mobile hard disk, Read-Only Memory (ROM), Random Access Memory (RAM), magnetic disk or compact disc or various media that can store the program codes.

It should be understood by those skilled in the art that the embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the embodiments of the present application have been described, those skilled in the art can make additional alterations and modifications to these embodiments once they learn about the basic creative concepts. Thus the attached claims are intended to be interpreted to include the embodiments as well as all the alterations and modifications falling within the scope of the present application.

Evidently those skilled in the art can make various modifications and variations to the embodiments of the present application without departing from the spirit and scope of the embodiments of the present application. Thus the present application is also intended to encompass these modifications and variations therein as long as these modifications and variations to the embodiments of the present application come into the scope of the claims of the present application and their equivalents.

What is claimed is:

1. A method of reporting CSI information, comprising:
 receiving, by a terminal, an uplink channel resource configuration signaling and a Demodulation Reference Signal, DMRS, configuration signaling, sent by a base station, and determining a mapping symbol set according to the uplink channel resource configuration signaling and DMRS configuration signaling; wherein the DMRS configuration signaling is used to indicate a quantity of DMRSs configured by a system for an uplink channel and a time-frequency position of an Orthogonal Frequency Division Multiplexing, OFDM, symbol occupied by each DMRS in time-frequency resources carrying the uplink channel, the uplink channel resource configuration signaling is used to indicate time-frequency resources occupied by the uplink channel, and the mapping symbol set is a set of OFDM symbols adjacent to the OFDM symbol in the time-frequency resources; wherein different DMRS configuration signalings indicate different quantities of DMRSs configured by the system for the uplink channel;

measuring, by the terminal, a downlink channel, and calculating Channel State Information, CSI, according to a measurement result; and coding, by the terminal, the CSI information, and mapping an information part containing Rank Indication, RI, information in the coded CSI information onto Resource Elements, REs, of at least one OFDM symbol in the mapping symbol set for transmission.

2. The method of claim 1, wherein after the terminal codes the CSI information and maps the information part containing the RI information in the coded CSI information onto the REs corresponding to at least one OFDM symbol in the mapping symbol set for transmission, the method further comprises:

determining, by the terminal, remaining OFDM symbols unmapped in the mapping symbol set and remaining CSI information parts in the coded CSI information other than the information part containing the RI information; and mapping, by the terminal, the remaining CSI information parts onto REs of the remaining OFDM symbols for transmission, and/or onto REs of OFDM symbols other than the OFDM symbols contained in the mapping symbol set in the time-frequency resources for transmission.

3. The method of claim 1, wherein after the terminal codes the CSI information and maps the information part containing the RI information in the coded CSI information onto REs of at least one OFDM symbol in the mapping symbol set for transmission, the method further comprises:

determining, by the terminal, remaining CSI information parts in the coded CSI information other than the information part containing the RI information; and mapping, by the terminal, the remaining CSI information parts onto REs corresponding to OFDM symbols other than the OFDM symbols contained in the mapping symbol set in the time-frequency resources for transmission.

4. The method of claim 1, wherein before the terminal codes the CSI information, the method further comprises:

acquiring, by the terminal, CSI feedback configuration information sent by the base station, wherein the CSI feedback configuration information is used to indicate a feedback mode configured by the system for the terminal to report the CSI information;

determining, by the terminal, an uplink channel used by the CSI information according to the CSI feedback configuration information and a correspondence between feedback modes and uplink channels;

coding, by the terminal, the CSI information, comprises:
coding, by the terminal, the CSI information according to the determined feedback mode and a correspondence between feedback modes and coding modes; wherein the coding modes comprise an overall coding mode and a split coding mode.

5. A method of receiving CSI information, comprising:
sending, by a base station, an uplink channel resource configuration signaling and a Demodulation Reference Signal, DMRS, configuration signaling, to a terminal; wherein the DMRS configuration signaling is used to indicate a quantity of DMRSs configured by a system for an uplink channel and a time-frequency position of an Orthogonal Frequency Division Multiplexing, OFDM, symbol occupied by each DMRS in time-frequency resources carrying the uplink channel, and the uplink channel resource configuration signaling is used to indicate time-frequency resources occupied by the uplink channel; wherein different DMRS configuration signalings indicate different quantities of DMRSs configured by the system for the uplink channel;

receiving, by the base station, coded Channel State Information, CSI, fed back by the terminal, and obtaining Rank Indication, RI, information comprised in the coded CSI information; wherein an information part containing the RI information in the coded CSI information is mapped onto Resource Elements, REs, of at least one OFDM symbol in a mapping symbol set that is a set of OFDM symbols adjacent to the OFDM symbol occupied by the DMRS in the time-frequency resources carrying the uplink channel; and decoding, by the base station, the coded CSI information according to the RI information.

6. The method of claim 5, wherein before the base station receives the coded CSI fed back by the terminal and obtains the RI information comprised in the coded CSI information, the method further comprises:

configuring, by the base station, CSI feedback configuration information used to indicate a feedback mode used by the terminal to report the CSI information;

sending, by the base station, the CSI feedback configuration information to the terminal so that the terminal feeds back the coded CSI information according to the CSI feedback configuration information.

7. A terminal, comprising:
a receiver configured to receive an uplink channel resource configuration signaling and a Demodulation Reference Signal, DMRS, configuration signaling sent by a base station, and determine a mapping symbol set according to the uplink channel resource configuration signaling and DMRS configuration signaling; wherein the DMRS configuration signaling is used to indicate a quantity of DMRSs configured by a system for an uplink channel and a time-frequency position of an Orthogonal Frequency Division Multiplexing, OFDM, symbol occupied by each DMRS in time-frequency resources carrying the uplink channel, the uplink channel resource configuration signaling is used to indicate time-frequency resources occupied by the uplink channel, and the mapping symbol set is a set of OFDM symbols adjacent to the OFDM symbol in the time-frequency resources; wherein different DMRS configuration signalings indicate different quantities of DMRSs configured by the system for the uplink channel;

a processor connected to the receiver and configured to measure a downlink channel, calculate Channel State Information, CSI, according to a measurement result, code the CSI information, and map an information part containing Rank Indication, RI, information in the coded CSI information onto Resource Elements, REs, of at least one OFDM symbol in the mapping symbol set; and a transmitter connected to the processor and configured to report the mapped CSI information.

8. The terminal of claim 7, wherein the processor is further configured to:

after coding the CSI information and mapping the information part containing the RI information in the coded CSI information onto the REs corresponding to at least one OFDM symbol in the mapping symbol set for transmission, determine remaining OFDM symbols unmapped in the mapping symbol set and remaining CSI information parts in the coded CSI information other than the information part containing the RI information, and map the remaining CSI information parts onto REs of the remaining OFDM symbols for transmission and/or onto REs of other OFDM symbols than the OFDM symbols contained in the mapping symbol set in the time-frequency resources.

9. The terminal of claim 7, wherein the processor is further configured to:

after coding the CSI information and mapping the information part containing the RI information in the coded CSI information onto the REs corresponding to at least one OFDM symbol in the mapping symbol set for transmission, determine remaining CSI information parts in the coded CSI information other than the information part containing the RI information, and map the remaining CSI information parts onto REs corresponding to other OFDM symbols than the OFDM symbols contained in the mapping symbol set in the time-frequency resources for transmission.

10. The terminal of claim 7, wherein the receiver is further configured to:

before the processor codes the CSI information, acquire CSI feedback configuration information sent by the base station, wherein the CSI feedback configuration information is used to indicate a feedback mode configured by the system for the terminal to report the CSI information, and determine an uplink channel used by the CSI information according to the CSI feedback configuration information and a correspondence between feedback modes and uplink channels;

the processor is further configured to: code the CSI information according to the determined feedback mode and a correspondence between feedback modes and coding modes;

wherein the coding modes comprise an overall coding mode and a split coding mode.

11. A base station, comprising a processor, a memory, a transmitter and a receiver, wherein:

the processor is configured to read programs in the memory to perform a process of the method of claim 5;

the transmitter is configured to send data under control of the processor; and the receiver is configured to receive data under control of the processor.

12. The base station of claim 11, wherein the processor is further configured to read programs in the memory to perform:

before receiving the coded CSI fed back by the terminal and obtaining the RI information comprised in the coded CSI information, configuring CSI feedback configuration information used to indicate a feedback mode used by the terminal to report the CSI information; and sending the CSI feedback configuration information to the terminal so that the terminal feeds back the coded CSI information according to the CSI feedback configuration information.

13. A computer device, comprising a processor configured, when executing a computer program stored in a memory, to implement the method of claim 1.

14. A non-transitory computer readable storage medium, wherein the computer readable storage medium stores computer instructions, which cause a computer to perform the method of claim 1 when running on the computer.

* * * * *